US005538570A

United States Patent [19]

Tooker

[11] Patent Number: 5,538,570

[45] Date of Patent: Jul. 23, 1996

[54] APPARATUS AND METHOD FOR APPLYING ADHESIVE FOR BOOK BINDING AND INDEPENDENT ADHESIVE ROLLER SPEED CONTROL

[76] Inventor: John C. Tooker, P.O. Box 1165, Medford, Oreg. 97501

[21] Appl. No.: 233,036

[22] Filed: Apr. 25, 1994

Related U.S. Application Data

[62] Division of Ser. No. 83,001, Jun. 25, 1993, Pat. No. 5,362,188, which is a division of Ser. No. 896,138, Jun. 9, 1992, Pat. No. 5,250,318, which is a division of Ser. No. 724,176, Jul. 1, 1991, abandoned, which is a continuation-in-part of Ser. No. 618,721, Nov. 27, 1990, abandoned.

[51] Int. Cl.$^6$ .......... B32B 31/00

[52] U.S. Cl. .......... 156/64; 156/356; 156/362; 156/578; 118/676; 118/682; 412/8; 412/13

[58] Field of Search .......... 156/64, 356, 362, 156/363, 364, 578; 118/676, 682; 412/8, 11, 13

[56] References Cited

U.S. PATENT DOCUMENTS

| | | | |
|---|---|---|---|
| 951,436 | 3/1910 | Duryea . | |
| 998,283 | 7/1911 | Duryea et al. . | |
| 3,437,506 | 4/1969 | Falberg . | |
| 3,707,135 | 12/1972 | Sharpe et al. | 118/244 |
| 4,244,200 | 1/1981 | Sando et al. . | |
| 4,246,868 | 1/1981 | Brown et al. . | |
| 4,270,967 | 6/1981 | Cone | 156/578 X |
| 4,299,410 | 11/1981 | Jukola . | |
| 4,456,379 | 6/1984 | Schumann et al. . | |
| 4,484,850 | 11/1984 | Shimizu . | |
| 4,547,000 | 10/1985 | Sallinen . | |
| 4,736,703 | 4/1988 | Mattei et al. | 156/356 X |
| 4,882,005 | 11/1989 | Thompson . | |
| 4,925,354 | 5/1990 | Cote . | |
| 4,984,949 | 1/1991 | Reckziegel . | |
| 4,997,509 | 3/1991 | Fujii | 156/364 |

FOREIGN PATENT DOCUMENTS

| | | | |
|---|---|---|---|
| 0268562 | 5/1988 | European Pat. Off. . | |
| 2425277 | 1/1980 | France | 118/261 |
| 864248 | 1/1953 | Germany | 281/21.1 |
| 1028534 | 4/1958 | Germany . | |
| 3815159 | 9/1989 | Germany . | |
| 3811133 | 9/1989 | Germany | 281/35 |
| 405233 | 7/1966 | Switzerland . | |

OTHER PUBLICATIONS

A. Furler, "Technologie der Klebebindung", Deutscher Drucker, Verlagsgesellschaft m.b.H. & Co., KG, Stuttgart, 1971, pp. 181–183. Translation provided.

*Primary Examiner*—David A. Simmons
*Assistant Examiner*—Paul M. Rivard
*Attorney, Agent, or Firm*—Robert L. Harrington

[57] ABSTRACT

A book binding process and apparatus are shown wherein polyurethane adhesive (PUR) attaches a crepe portion of a book binding to a book block and hot glue attaches the crepe portion to the book cover. The PUR delivery system includes an inclined trough positioned adjacent a polyurethane adhesive delivery roll. A polyurethane adhesive.source delivers polyurethane adhesive upon the inclined surface of the trough and the polyurethane adhesive is metered onto the roller as a function of the separation of the leading edge of the trough and the roller.

12 Claims, 6 Drawing Sheets

APPARATUS AND METHOD FOR APPLYING ADHESIVE FOR BOOK BINDING AND INDEPENDENT ADHESIVE ROLLER SPEED CONTROL

RELATED APPLICATIONS

This application is a Divisional Application of U.S. application Ser. No. 08/083,001 entitled APPARATUS AND METHOD FOR APPLYING ADHESIVE FOR BOOK BINDING AND INDEPENDENT ADHESIVE ROLLER SPEED CONTROL, filed Jun. 25, 1993 by applicant herein John C. Tooker, now U.S. Pat. No. 5,362,188. The above-noted parent application Ser. No. 08/083,001 was a Divisional Application of U.S. application Ser. No. 07/896,138 entitled APPARATUS AND METHOD FOR APPLYING ADHESIVE FOR BOOK BINDING, filed Jun. 9, 1992 by applicant herein John C. Tooker, now U.S. Pat. No. 5,250, 318.

The above-noted application Ser. No. 07/896,138 was a Divisional Application of U.S. patent application Ser. No. 07/724,176 filed Jul. 1, 1991 by applicant herein, John C. Tooker. Application Ser. No. 07/724,176 was a Continuation-in-Part of now abandoned U.S. patent application Ser. No. 07/618,721, entitled BINDING FOR SOFT COVER BOOKS, filed Nov. 27, 1990 by applicant herein, John C. Tooker. The entire disclosure of U.S. patent application Ser. No. 07/618,721 is incorporated herein by reference.

FIELD OF THE INVENTION

This invention relates to the application of adhesive to a book block spine in a binding operation, and more particularly to the application of polyurethane adhesive as a binding adhesive.

BACKGROUND OF THE INVENTION

Polyurethane adhesive is desirable as an adhesive for book binding. The polyurethane adhesive cures to form a film that strongly adheres to the page edges exposed at the book block spine, but is pliable and permits easy opening of the book.

There have been problems with use of polyurethane adhesive (PUR) in book binding. Once the material is exposed to moisture in the atmosphere it cures, i.e., becomes cross linked, and will thereafter not return to liquid form as is possible with conventional hot melt book binding adhesives. Typically, adhesives are applied to a book block spine using a roller. The roller is immersed within a pan containing a quantity of liquid adhesive. The adhesive clings to the roller surface for transfer to book blocks passing over the top of the roller. As book blocks pass by and contact the top of the roller, the book block spines receive the adhesive from the roller surface.

This process of bathing the roller in adhesive is acceptable for conventional hot glue book binding adhesives placed in and returned to liquid form by heating. It will also work for the PUR adhesive as long as the process is not interrupted, i.e., as long as the bath of liquid PUR is continuously applied to the roller and then to the book block spine before cross linking occurs and as long as the bath of liquid PUR is continuously replenished. When the process is interrupted, however, as it invariably is, the PUR liquid starts to cure. In a short time, the PUR on the roller and in the pan begins to cure from exposure to atmospheric moisture. For PUR this curing is irreversible. Before the binding process can be restarted, the roller and pan may have to be cleaned of the PUR. This is a time consuming and highly undesirable occurrence that, heretofore, has been unavoidable with use of PUR in book binding.

SUMMARY OF THE INVENTION

In accordance with the present invention a method and apparatus for applying adhesive to a book block includes an adhesive dispensing apparatus mounted to a conventional book binding apparatus and including an adhesive delivering roller having independent rotational speed control provided as a function of a book block moving thereacross and further as a function of a speed control input modifying roller rotational speed relative to the speed of the book block moving therepast. In the preferred embodiment of the present invention, the adhesive delivering roll may be operated in overspin relationship relative to the rectilinear speed of a book block moving therepast.

In the preferred embodiment of the present invention, a teflon (TM) coated roller is used, but without the pan of the prior system. Instead an inclined trough having a lower edge located adjacent the roller meters PUR onto the roller. The trough defines a metering slit at its leading edge and the roller surface. The liquid PUR is deposited (e.g. from a transfer tube) onto the trough and flows down the trough, through the metering slit and onto the roller. The PUR clings to the roller surface as the roller rotates under and back up the opposite side to be transferred onto the book block spine. The trough may be pivoted to drive the leading edge onto the roller and cease metering.

The trough need only contain enough PUR to coat a small number of book blocks, e.g., 6–10 book blocks. When a shut down is required, the process may run through the extra limited number of book blocks to exhaust the PUR supply, or the excess PUR is simply captured in a separate container. The problem of clean up is not entirely eliminated, but is significantly reduced at a substantial savings in time and material.

The invention will be more fully appreciated by reference to the following detailed description and drawings as referred to therein.

DETAILED DESCRIPTION

Figure 1:
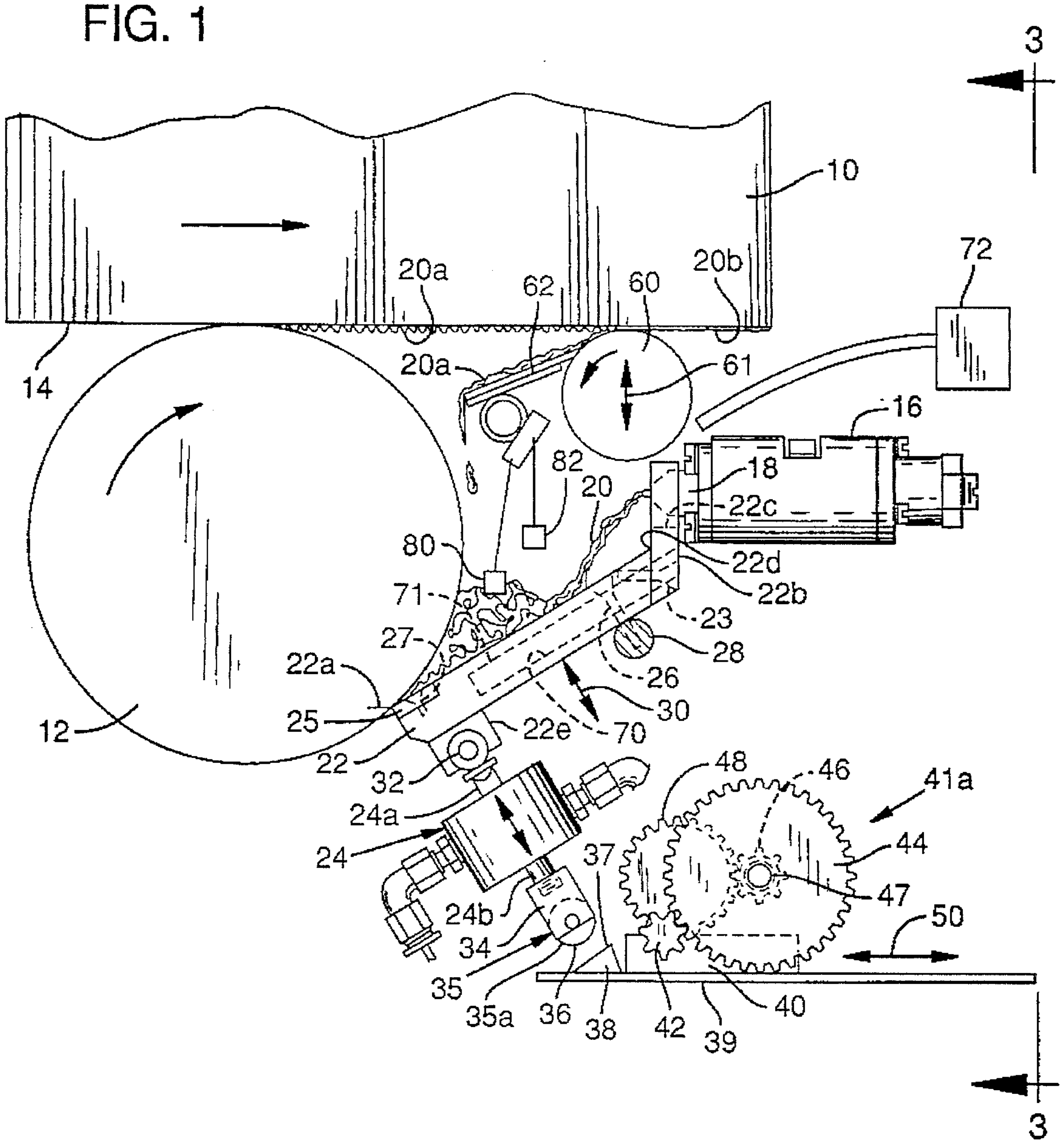
FIG. 1 is a side view of book binding machine showing portions of the machine relative to application of polyurethane adhesive (PUR) to a book spine in a book binding operation.

FIG. 1 shows the polyurethane adhesive (PUR) delivery portions of a book binding machine in accordance with the present invention. The preferred embodiment of the present invention has been implemented in a Muller Martini 30 Clamp Star Perfect Binder. It will be understood that the PUR delivery system shown in FIGS. 1–4 can be integrated into the Muller binding machine in place of its book spine hot melt adhesive applying station. The Muller machine comprises many components independently mounted and modularly interchangeable. It will be further understood, therefore, that integration of such PUR delivery system into the Muller Martini Perfect Binders or any other binding machinery, given the disclosure of the PUR delivery system herein, is within the capability of one of ordinary skill in the book binding art.

In FIG. 1, a book block 10 travels from left to right, in the view of FIG. 1, across a teflon coated (TM) PUR roller 12. Roller 12 carries PUR for delivery upon the book block spine 14 of book block 10 as block 10 passes over roller 12. A PUR source 16 includes an outlet nozzle 18 for depositing PUR 20 upon an inclined trough 22 having a leading edge 22*a* positioned adjacent roller 12. Leading edge 22*a* is defined by a replaceable teflon (TM) wear plate 25 mounted by screws 27 upon the body of trough 22. A spine plate 22*b* of trough 22 rests substantially vertically in the machine and attaches to the rear of trough 22 at the screws 23. Spine plate 22*b* includes an oversized notch formation 22*c* for receiving the nozzle 18 of PUR source 16 and allowing delivery of PUR 20 upon the inclined upper surface of trough 22. Spine plate 22*b* prevents overflow of PUR 22 over the top edge 22*d* of trough 22. The PUR 20 then flows by gravity upon trough 22 from nozzle 18 down to the leading edge 22*a* and contacts roller 12. PUR 20 is metered onto roller 12 as a function of the separation between leading edge 22*a* and roller 12.

A double ended pneumatic cylinder 24 controls spacing between leading edge 22*a* of trough 22 and roller 12 by pivoting trough 22. Trough 22 attaches by screws 26 to a support rod 28. Support rod 28 rotatably mounts by bearing arrangement 96 (FIG. 3) for pivoting of trough 22, as indicated at reference numeral 30, about the axis of rod 28. Leading edge 22*a* moves away from and toward roller 12 under the influence of cylinder 24. Pneumatic cylinder 24 couples pivotally at its upper piston end 24*a* to the pin 32 which mounts pivotally within blocks 22*e* (one visible in FIG. 1) on the underside of trough 22. The body of cylinder 24 also mounts pivotally to a frame portion (not shown in FIG. 1) of the machine. A distal lower piston end 24*b* of cylinder 24 extends downward and toward an inclined surface 37 of block 38. A clevis 34 threadably mounts upon piston end 24*b* and carries a bearing assembly 35 thereon. The outer race 35*a* of bearing assembly 35 engages the inclined surface 37 of block 38 upon actuation of cylinder 24 toward block 38. Block 38 mounts upon a carriage plate 39 which also carries rack gears 40. The carriage plate 39, and therefore block 38 and rack gears 40, are slidably mounted upon the book binding machine.

Figure 2:
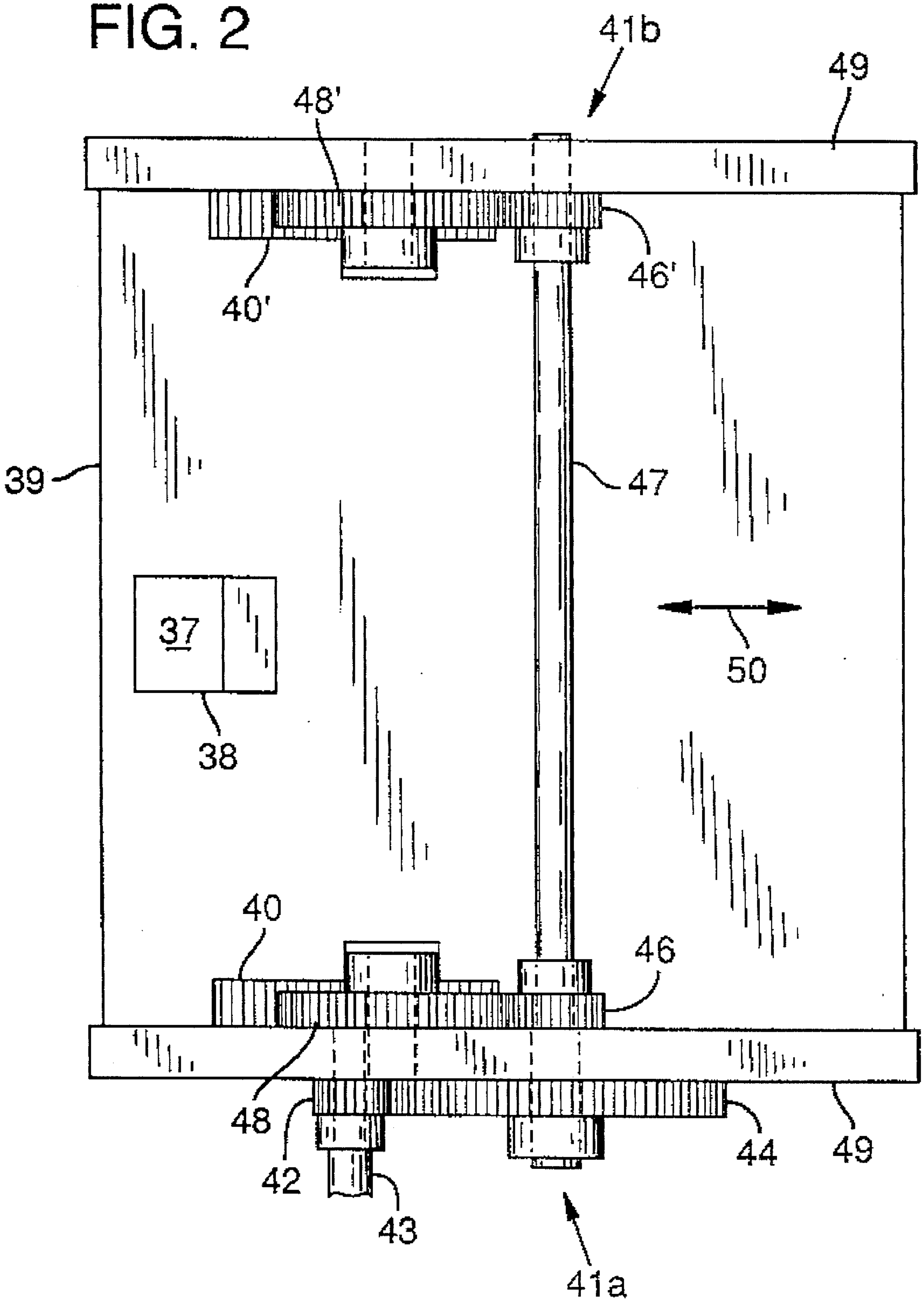
FIG. 2 is a top view of a gear assembly of the binding machine for adjusting the amount of PUR metered onto the roller.

With reference to FIGS. 1 and 2, a gear assembly 41 slides the carriage plate 39 by way of rack gears 40 and 40' for precise positioning of block 38 relative to pneumatic cylinder 24. An input shaft 43 (FIG. 2) couples to a first gear 42 which engages a larger second gear 44 carrying, by way of shaft 47, an inner gear 46 which engages a rack engaging gear 48. Coupling shaft 47 rotatably mounts upon side frame walls 49 and connects the first mentioned gear 46 to a similar gear 46' of gear assembly 41*b*. The gear 46' of assembly 41*b* then couples to a second rack engaging gear 48'. A second rack gear 40' also mounts upon the slidable carriage plate 39 for engagement by the gear 48'. The carriage plate 39 thereby moves uniformly between side frame walls 49 under the influence of gear assembly 41.

As input gear 42 rotates, the gear train 44, 46 and 48 of assembly 41*a* and the gear train 46', 48' of assembly 41*b* provides left and right movement of rack gears 40 and 40', in the view of FIGS. 1 and 2, as indicated at reference numeral 50. The input gear 42 carries 32 teeth, the larger gear 44 carries 144 teeth, the gears 46 and 46' each carry 36 teeth, and the rack engaging gears 48 and 48' each carry 90 teeth.

In the preferred embodiment, input gear 42 is manually adjusted through 270 degrees of rotation for selected positioning of block 38 relative to pneumatic cylinder 24 to accomplish selected metering of PUR 20 upon roller 12. More particularly, moving block 38 toward cylinder 24 limits the throw of piston end 24*b*. As a result, edge 22*a* moves a lesser distance from roller 12 relative to that possible when block 38 is moved away from cylinder 24. In the preferred embodiment, the overall range of pivoting movement of leading edge 22*a* relative to roller 12 is on the order of one-eighth inch as input shaft 43 moves through 270 degrees. Within that range, however, gear assembly 41 provides a high degree of metering precision for application of PUR 20 to roller 12.

During operation, the cylinder 24 is actuated to draw leading edge 22*a* away from roller 12 to its greatest extent possible as defined by the position of block 38. This adjustment determines the spacing between edge 22*a* and roller 12 and, therefore, the amount of PUR 20 deposited on roller 12 upon actuation of cylinder 24. Leading edge 22*a* could be left in a retracted position during operation to constantly meter PUR 20 onto roller 12. Cylinder 24 is, however, actuated intermittently to push leading edge 22*a* against roller 12 to controllably cease metering of PUR 20 onto roller 12. By monitoring the speed of book block 10 and knowing the length of book block 10, actuation of pneumatic cylinder 24 may be timed to dispense a given amount of PUR 20 upon roller 12 to coincide with passage of book block 10 over roller 10. In this regard, it is preferred that the top and bottom one-sixteenth inch of book block 10 not be coated with PUR 20. Accordingly, the circumferential distance through which roller 12 rotates while trough 22 is disengaged from roller 12 by pneumatic cylinder 24 corresponds to the length of book block 12, preferably minus one-eighth inch, and positioned for suitable delivery upon the book spine 14 as block 10 passes.

Returning to FIG. 1, as book block 10 passes over roller 12, it collects PUR 20*a* on its spine 14. A teflon (TM) coated back spinner roller 60 positioned down stream from roller 12, and moving in the opposite rotational direction of roller 12, removes excess PUR 20*a* from book spine 14 and performs a final metering step. An inclined scraper blade 62 (intermediate of rollers 12 and 60) engages roller 60 to remove from roller 60 the PUR 20*a* taken from book spine 14. Scraper blade 20 rests above trough 22 to return PUR 20*a* to the body of PUR 20 on trough 22. Back spinner roller 60 is vertically positionable relative to the path of book block 10 as indicated at reference numeral 61 to achieve precise final metering of PUR 20*b* on book spine 14. The back spinner roller 60 is typically positioned between 0.008 and 0.015 inches from book spine 14 whereby a thin film of PUR 20*b* remains upon spine 14 of book block 10 as it exits the PUR delivery operation.

The temperature of PUR 20 should be maintained at sufficient level to prevent premature cross linking and also to prevent the introduction of hazardous by-products into the work environment. Accordingly, the trough 22 includes apertures 70 for receiving heater units 71 whereby the PUR 20 resting upon trough 22 is maintained at the desired temperature. Furthermore, the rollers 12 and 60 are heated rollers also maintained at the desired temperature. The PUR source 16 delivers PUR 20 to the trough 22 at the desired temperature. PUR 20 should be maintained at a constant temperature in a range of 230 to 250 degrees fahrenheit. If the temperature rises above 250 degrees, hazardous gas emissions result. Maintaining PUR 20 in this range substantially limits the amount of moisture to which the PUR 20 is exposed and thereby avoids undesirable premature cross linking of PUR 20. Additionally, a desiccated air or nitrogen source 72 may be provided for introducing desiccated air or nitrogen onto the body of PUR 20 resting on trough 22 to further isolate PUR 20 from ambient moisture.

A second consideration in working with PUR 20 as an adhesive for book binding is the frequent shut down of the book binding machinery. This can represent a significant problem when working with PUR 20 because it is difficult to clean PUR 20 from the machine once cross linking begins. Use of trough 22 in the PUR delivery system requires only a small quantity of PUR 20 at any given time. More particularly, trough 22 need only contain sufficient PUR 20 to apply to a limited number of book blocks 10, e.g., to only 6–10 book blocks 10. In contrast, the prior methods of PUR delivery included a substantially larger volume of PUR needed to immerse the dispensing roller. Thus, clean up is minimized under the present invention especially when PUR source 16 can be first shut down and several additional book blocks 10 processed to exhaust the supply of PUR 20 resting on trough 22.

To monitor the amount of PUR 20 in trough 22, a differential temperature sensing method is employed. A low sensor 80 is positioned close to trough 22 while an upper temperature 82 sensor rests further above trough 22. The control system monitors the output from sensors 80 and 82 and determines when the volume of PUR 20 in trough 22 is low enough to require activation of PUR source 16, i.e., when to deliver additional PUR 20. When the temperature output of sensor 80 is greater than that of temperature sensor 82, the control system concludes that the temperature sensor 80 is immersed in the PUR 20 and that the temperature sensor 82 is not. Additional PUR 20 is then dispensed onto trough 22 until temperature sensors 80 and 82 provide substantially equal output, i.e., until both temperature sensors 80 and 82 are immersed in the body of PUR 20.

Figure 3:
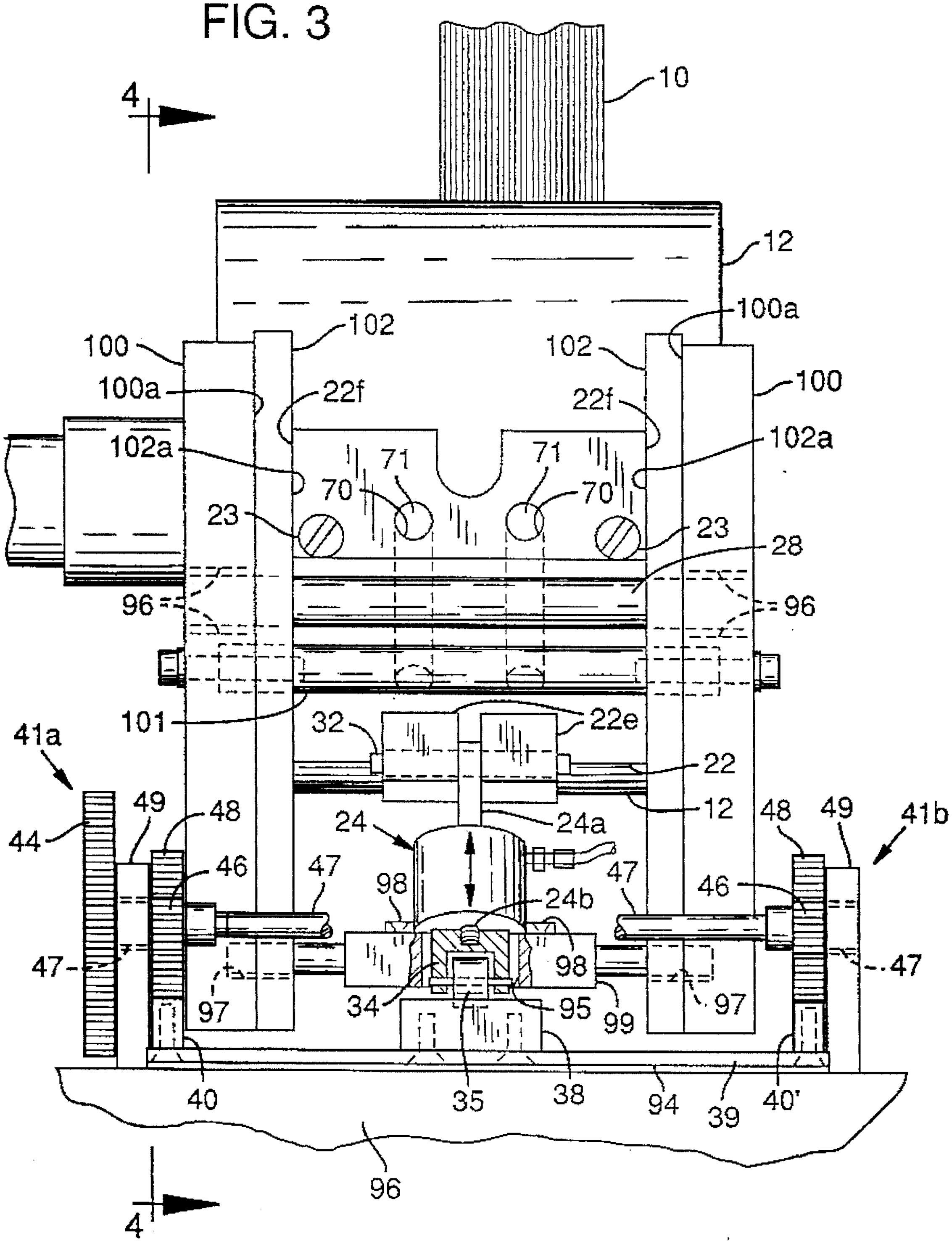
FIG. 3 is an end view of the binding machine as taken along lines 3—3 of FIG. 1 but showing parts previously omitted from FIG. 1 and omitting parts shown in FIG. 1 for clarity.

FIG. 3 is an end view of the binding machinery shown in FIG. 1 taken along lines 3—3 of FIG. 1, but omitting the PUR source 16 and the back spinner roller 60.

In FIG. 3, the left gear assembly 41*a* and right gear assembly 41*b* are shown with the coupling shaft 47 (broken away) therebetween for movement of carriage plate 39. It is suggested that the under surface 94 of carriage plate 39 include a low friction interface with the frame 96 of the book binding machine for suitable movement of carriage plate 39. FIG. 3 also shows the central positioning of cylinder 24 and block 38 and both the blocks 22*e* for supporting the pin 32 at the under surface of trough 22. FIG. 3 further illustrates bearing mounts 96 in side walls 100 for rotationally supporting the shaft 28 and allowing pivotal support of trough 22.

The body of pneumatic cylinder 24 is attached to a support shaft 99 at the screws 98. Support shaft 99 is rotationally supported by the side walls 100 by way of bearing mounts 97 in walls 100. Support shaft 99 (broken away in FIG. 3) includes an aperture 95 allowing passage therethrough of the clevis 34 and bearing assembly 35 for engagement with the block 38.

Relative spacing of side walls 100 is maintained by bracing shaft 101, of which only one is shown in FIG. 3. It will be understood, however, that several such bracing shafts 101 may be necessary to suitably maintain a spaced and face-to-face relation between side walls 100.

The inner or opposing surfaces 100*a* of side walls 100 carry teflon (TM) containment walls 102. Containment walls 102 abut the outer edges 22*f* of trough 22 for containment of the body of PUR 20 resting on the inclined surface of trough 22. The opposing faces 102*a* of containment walls 102 thereby slidably engage the edges 22*f* of trough 22 as trough 22 pivots during operation.

Figure 4:
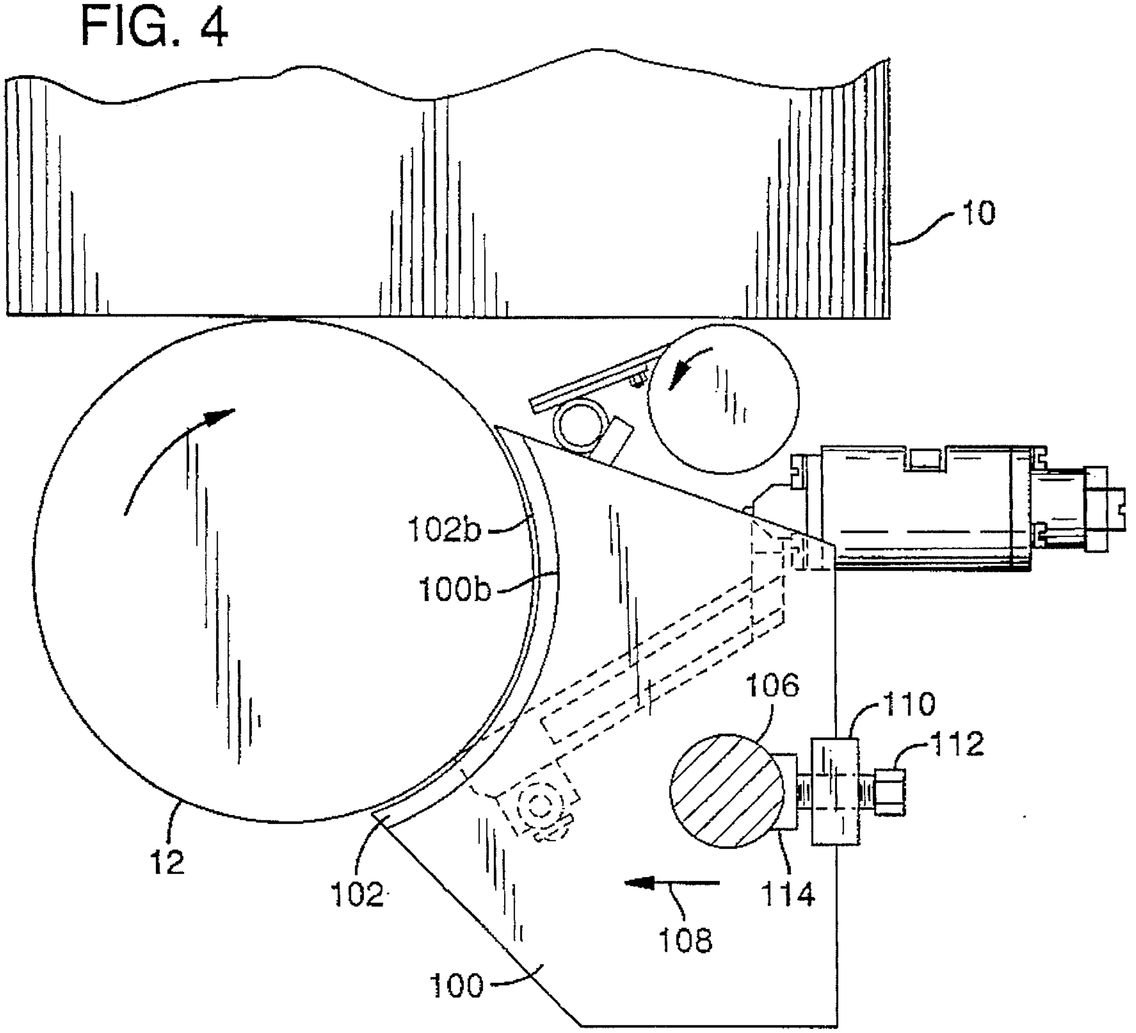
FIG. 4 is a side view similar to that of FIG. 1 but showing certain portions of the machine omitted from FIG. 1 for clarity.

FIG. 4 shows a side view taken along lines 4—4 of FIG. 3 showing the interface between the side walls 100, containment walls 102, and the PUR roller 12. More particularly, the leading edges 100*b* and 102*b* of side walls 100 and containment walls 102, respectively, have a radius of curvature matching that of PUR roller 12. The leading edges 102*b* engage roller 12 for sealing the interface between containment walls 102 and PUR roller 12 for suitable containment of the body of PUR 20 resting on trough 22. The leading edges 102*b* of containment walls 102 extend approximately one-tenth inch beyond the leading edges 100*b* to allow for wear in the edges 102*b*.

The side walls 100 and containment walls 102 are adjustably positionable for moving the assembly of side walls 100 and containment walls 102 toward the roller 12 as the leading edges 102*b* of containment walls 102 wear during operation. More particularly, a mounting shaft 106 (previously omitted from FIGS. 1–3) extends through side walls 100 and containment walls 102 for advancing side walls 100 and containment walls 102 in the direction 108 as indicated in FIG. 4. An adjustment block 110 mounts upon the main frame (not shown) of the binding machine and an adjustment screw 112 threaded therein bears against a block 114 to urge the mounting shaft 106 toward roller 12. Accordingly, manipulation of the screw 112 advances the side walls 100 and containment walls 102 toward the roller 12 to accommodate wear in the leading edges 102*b* of containment walls 102.

Figure 5:
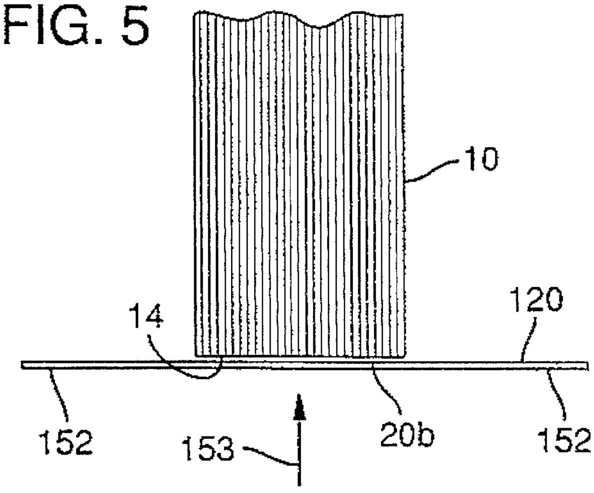
FIG. 5 illustrates joining of a crepe to a book block using PUR applied to the book block as illustrated in FIGS. 1–4.

FIG. 5 is an end view of the book block 10 following application of the PUR 20*b* as shown in FIG. 1. In FIG. 5, a crepe 120 is brought up against the book spine 14 as coated with the PUR 20*b*. Engagement of crepe 120 and book block 10 may be accomplished by conventional methods, i.e., mull stations, wherein crepe 120 is delivered against book spine 14 in the direction indicated by the arrow 153.

Figure 6:
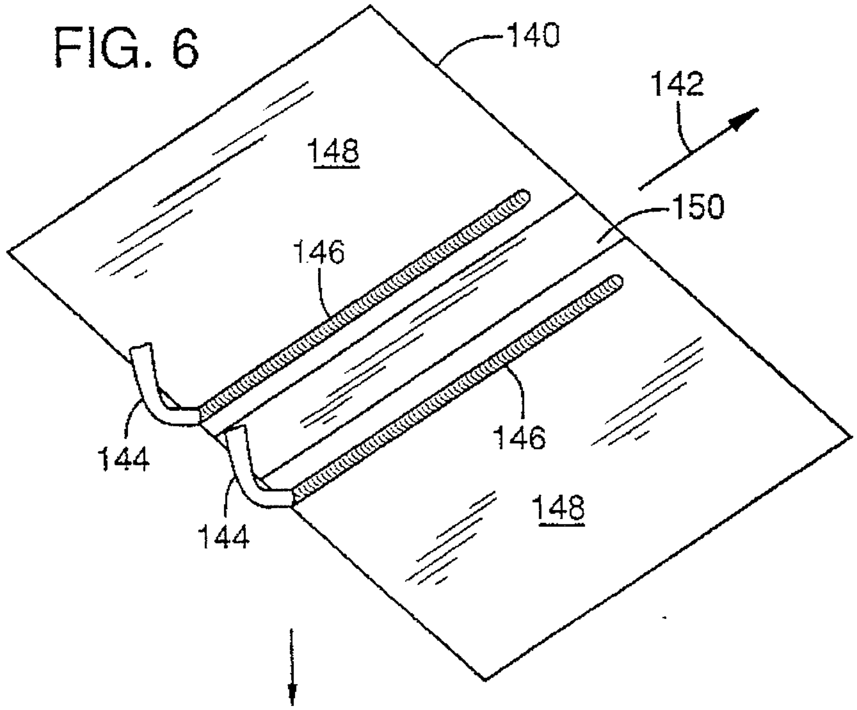
FIG. 6 illustrates application of hot glue to a book cover in accordance with the present invention for bonding to the crepe and book block of FIG. 4.

FIG. 6 shows preparation of a book cover 140 for attachment to the crepe 120. In FIG. 6, the cover 140 is transported into the direction 142 relative to hot glue extrusion guns 144 to apply glue ribbon 146 along the inner surface 148 of cover 140 near the cover spine section 150. In the preferred embodiment, glue ribbons 146 are applied to the book cover 140 using a Slautterback KB30 melt unit modified to provide a ribbon extrusion as opposed to a bead, i.e., circular, extrusion. More particularly, the Slautterback melt unit is modified by nozzle replacement wherein replacement nozzles include a slit aperture for producing a ribbon extrusion approximately 0.100 inch in width and 0.010 inch in height. An acceptable material for the hot glue ribbons 146 is available from National Starch and Chemical Company under the product No. 70-3136. Hot glue ribbons 146 are positioned to engage the outer edges 152 (FIG. 5) of crepe 120.

Figure 7:
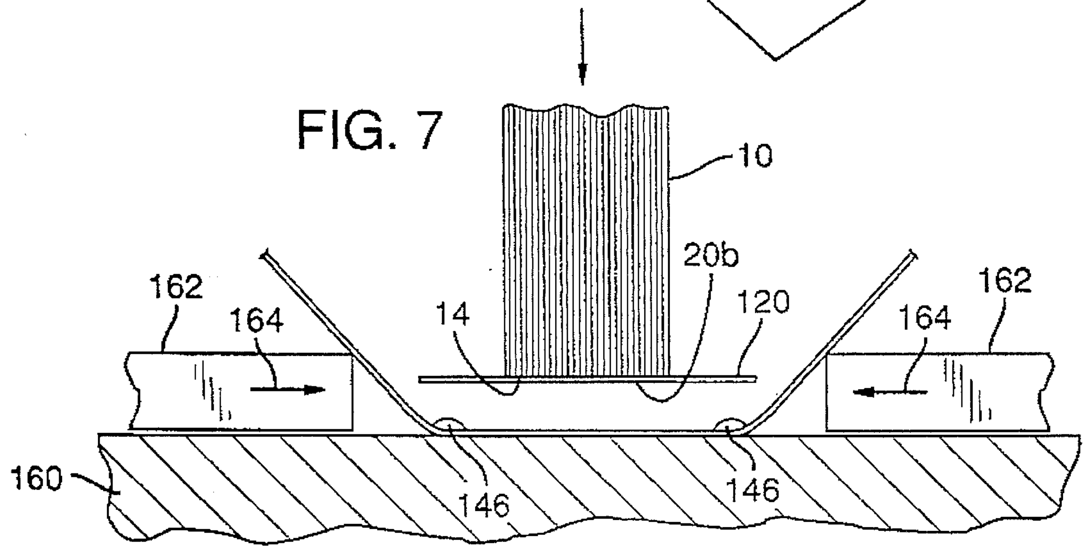
FIGS. 7 and 8 show final assembly of the book block, crepe and book cover.
Figure 8:
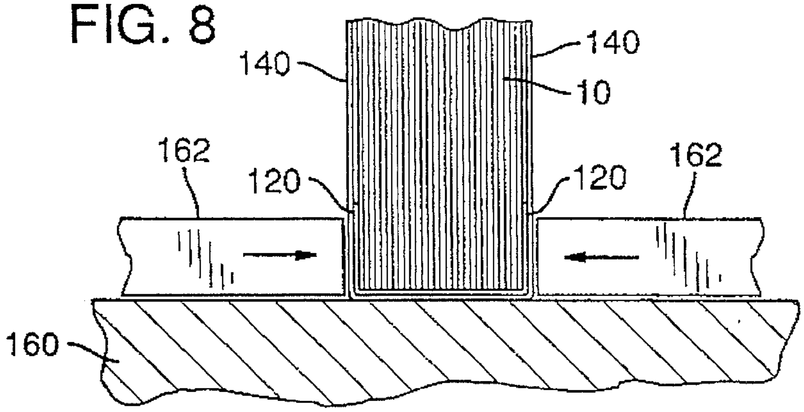

FIGS. 7 and 8 illustrate assembly of book block 10, crepe 120 and cover 140 at a cover nipping station. In FIG. 7, the cover 140 attaches to crepe 120 by way of the glue ribbons 146. The crepe 120 attaches to book block 10 by way of the PUR 20*b* previously deposited on the book spine 14. The assembly of book block 10, crepe 120 and cover 140 come to rest against a base plate 160. A pair of side plates 162 move laterally inward toward the assembly as indicated by arrows 164. As the side plates 162 engage the cover 140, the cover 140 and crepe 120 fold up around the book block 10 as shown in FIG. 8. During this process, the hot glue ribbons 146 join the crepe 120 and cover 140 to complete the book binding process. The assembly may then be removed from the nipping station be for final curing.

Figure 9:
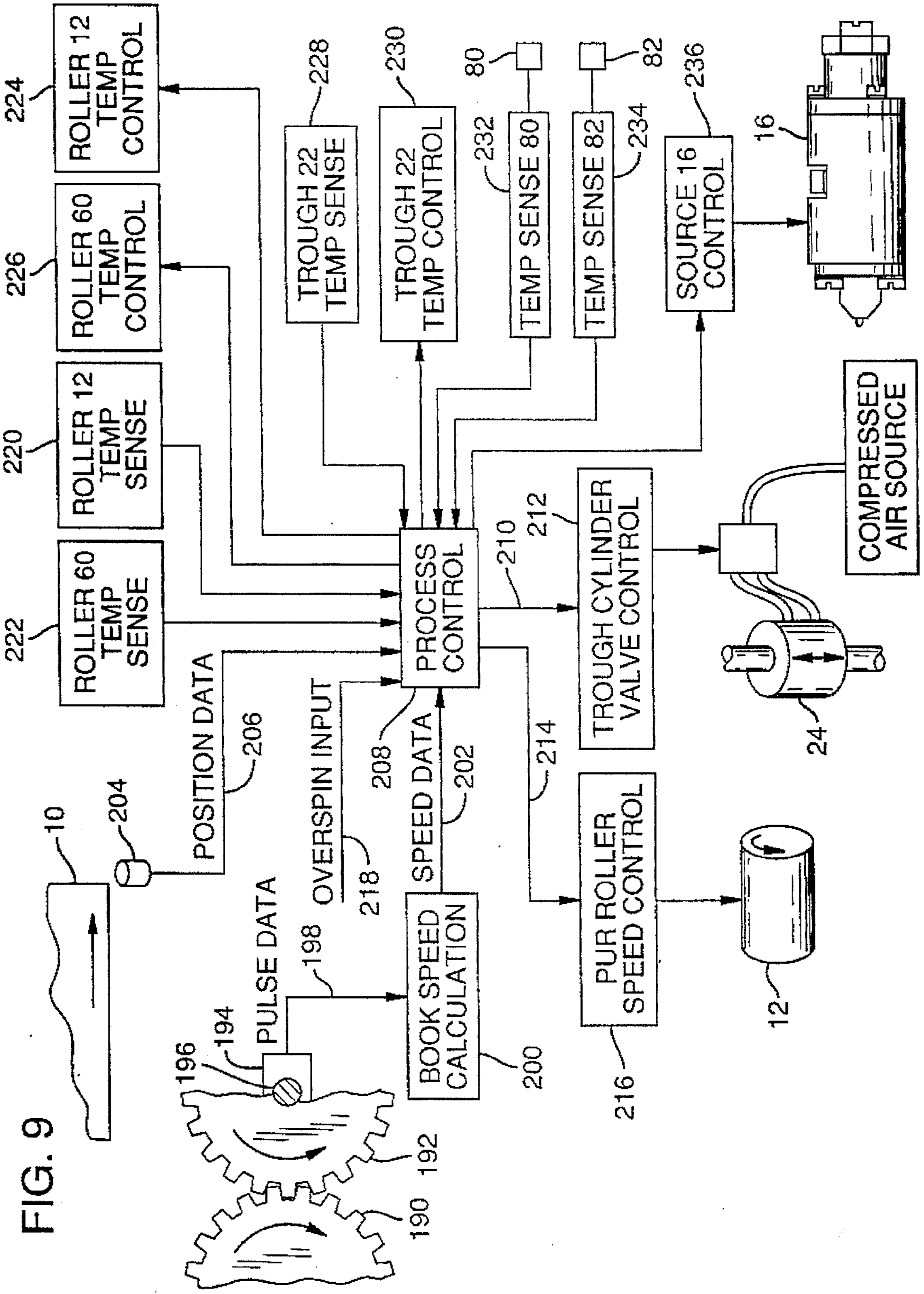
FIG. 9 is a block diagram illustrating process control associated with PUR delivery as illustrated in FIGS. 1–4.

FIG. 9 is a block diagram illustrating process control of the PUR delivery system illustrated in FIGS. 1–4. In FIG. 9, gear 190 is part of, or is mechanically coupled to, the portion of the binding machinery responsible for transport of book block 10. The rotational speed of gear 190 is used to derive a book block 10 speed. Gear 192 mechanically couples to the gear 190 and, therefore, also rotates according to the speed of book block 10 through the binding machinery. A pulse generating device 194 couples to the shaft 196 which carries gear 192. Pulse generating device 194 thereby provides pulse data 198 representing the speed of book block 10. Pulse data 198 is delivered to a book speed calculation block 200 which converts pulse data 198 into speed data 202. A photo sensor 204 positioned adjacent the path of book block 10 provides position data 206 representing a given position at a given time for book block 10. Position data 206 and speed data 202 are delivered to a process control block 208.

It may be appreciated that given the speed data 202 and position data 206, and assuming a constant velocity for book block 10, the position of book block 10 may be determined at any given subsequent time. With the ability of process control 208 to locate the position of book block 10 at a given time, process control 208 has sufficient information to suitably control actuation of pneumatic cylinder 24. More particularly, process control 208 delivers a control signal 210 to a trough cylinder valve control block 212. As previously described, it is desirable to apply PUR 20 (FIG. 1) to a given portion of book spine 14. Specifically, PUR 20 is deposited upon the length of book spine 14 but omitting the first and last one-sixteenth inch length portion of book spine 14. Process control 208 suitably actuates pneumatic cylinder 24 to draw leading edge 22*a* (FIG. 1) away from roller 12 whereby the leading portion of the PUR on roller 12 coincides with the leading portion of book block 10. Furthermore, process control 208 actuates pneumatic cylinder 24 to then drive leading edge 22*a* back against roller 12 at such time that the trailing edge of PUR 20 upon roller 12 coincides with the trailing end of the book block 10. In this manner, the desired delivery of PUR 20 upon book spine 14 is achieved wherein the first one-sixteenth and last one-sixteenth inch of book spine 14 do not receive PUR 20.

Process control 208 is further responsible for controlling the speed of PUR roller 12. More particularly, process control 208 utilizes speed data 202 to provide a control signal 214 for delivery to a PUR roller speed control block 216. The speed control signal 214 causes rotation of PUR roller 12 at a speed corresponding to the rotational speed of roller 22. More particularly, it has been found advantageous to provide an overspin relationship between the rotational speed of roller 12 and the rectilinear speed of book block 10.

Process control 208 receives overspin input 218 corresponding to a desired overspin of roller 12 relative to the rectilinear speed of book block 10. Typically, the overspin of roller 12 is up to three percent greater than the rectilinear speed of book block 10. Thus, process control 208 accepts speed data 202 from book speed calculation block 200 and overspin input 218 to develop a suitable speed control signal 214 for presentation to PUR roller speed control block 216. In this manner, the PUR roller 12 may be operated at a desired overspin speed relative to the travel of book block 10.

Process control 208 also receives temperature information relative to rollers 12. More particularly, roller 12 temperature sense block 220 and roller 60 temperature sense block 222 provide process control 208 with the current temperature of rollers 12 and 60, respectively. Process control 208 then compares the current temperature of rollers 12 and 60 to a desired temperature for rollers 12 and 60 and provide suitable output signals to roller 12 temperature control block 224 and roller 60 temperature control block 226. Similarly, the temperature of trough 22 is maintained at the desired temperature by means of a trough 22 temperature sense 228 delivering the current temperature of trough 22 to process control 208, and a corresponding output signal from process control 208 to trough 22 temperature control 230. It should be understood that the control of temperature of rollers 12 and 60 and trough 22 may be achieved in conventional feed back control loop fashion.

As previously described, the volume of PUR 20 maintained upon the trough 22 is controlled by a differential temperature sending method. Accordingly, temperature sense 80 block 232 and temperature sense 82 block 234 report the current output from temperature sensors 80 and 82, respectively. Process control 208 then provides an output signal to source 16 control block 236 for suitably maintaining the volume of PUR 20 on trough 22. More particularly, when the block 232 reports a higher temperature than the block 234, process control 208 causes block 236 to actuate source 16 to deliver additional PUR 20 upon trough 22 and until such time as sensor 82 reports substantially the same temperature as that of sensor 80.

While a preferred embodiment of the present invention has been shown and described, it may be appreciated that various modifications may be made to the embodiment shown herein without departing from the scope of the invention as found in the appended claims and equivalents thereof.

What is claimed is:

1. A method of applying adhesive to a book block controllably moving through book binding machinery at a given rectilinear speed, the method comprising:

mounting in relation to said book binding machine an adhesive applying apparatus, said adhesive applying apparatus including an adhesive delivering roller positioned for passage of a book block therepast; and operating said roller at a selected rotational speed corresponding generally to a given rotational speed matching the rectilinear speed of said book block but deviating from said given rotational speed by a selected deviation.

2. A method according to claim 1 wherein said selected deviation establishes an overspin relationship of said selected rotational speed relative to said given rotational speed.

3. A method according to claim 2 wherein said overspin relationship is in a range up to three percent.

4. A method according to claim 1 wherein the adhesive is a polyurethane adhesive.

5. A method according to claim 1 further comprising the steps:

detecting said book rectilinear speed by sensor applied to said book binding machinery;

generating a book speed signal as a function of said detecting step;

applying said book speed signal to a roller speed control in conjunction with a speed deviation signal; and operating said roller in response to said roller speed control as a function of said book speed signal and said speed deviation signal.

6. In a method of applying polyurethane adhesive to a book spine, an improvement comprising:

maintaining a limited body of said adhesive upon the upper surface of an inclined heated trough having a leading edge positionable with respect to a portion of a heated cylindric roller surface parallel to said leading edge;

rotating said roller to meter said body of adhesive onto said roller surface as a function of the spacing between said leading edge and said roller surface, said rotating of said roller being at a rotational speed corresponding generally to a rectilinear speed of said book spine but deviating therefrom by a selected magnitude deviation; and passing said book spine across said roller surface to transfer said adhesive to said book spine.

7. An improvement according to claim 6 wherein said rotational speed exceeds a given rotational speed matching said rectilinear speed.

8. An improvement according to claim 7 wherein said rotational speed exceeds said given rotational speed by a factor up to three percent.

9. An improvement according to claim 6 wherein said rectilinear speed of said book spine is established from a binding machine drive gear rotational speed.

10. A method according to claim 6 further comprising the steps:

detecting said book rectilinear speed by sensor applied to said book binding machinery;

generating a book speed signal as a function of said detecting step;

applying said book speed signal to a roller speed control in conjunction with a speed deviation signal; and operating said roller in response to said roller speed control as a function of said book speed signal and said speed deviation signal.

11. A method of applying polyurethane adhesive to a book spine, the method comprising:

maintaining a body of said polyurethane adhesive;

maintaining an adhesive applying roller in contact with said body of said adhesive;

passing said book spine by and in contact with said adhesive applying roller; and rotating said adhesive applying roller at a rotational speed providing an overspin relationship between said roller and said book spine, said overspin relationship causing a portion of said roller in contact with said book spine to move faster than said book spine in the direction of said book spine movement.

12. A method according to claim 11 wherein said portion of said roller in contact with said book spine moves in a range of up to three percent faster than said book spine in the direction of said book spine travel.

* * * * *